United States Patent [19]
Takizawa et al.

[11] 3,909,918
[45] Oct. 7, 1975

[54] METHOD OF JOINING THE EDGE PORTIONS OF TWO SHEETS

[75] Inventors: Hideo Takizawa, Hachioji; Hiroyuki Aida, Tokyo; Yoshiyuki Miyabayashi, Tokyo; Norihiro Tsuneishi, Tokyo, all of Japan

[73] Assignee: Nissan Motor Company, Limited, Japan

[22] Filed: Jan. 29, 1974

[21] Appl. No.: 437,715

[30] Foreign Application Priority Data
Jan. 31, 1973  Japan.............................. 48-13528

[52] U.S. Cl. ...................... 29/509; 29/513; 29/521; 113/1 N; 113/116 C
[51] Int. Cl.²..................... B21D 39/00; B23P 11/00
[58] Field of Search ............. 29/463, 462, 509, 512, 29/513, 521, 505; 113/1 N, 116 C, 116 F, 116 R, 118 R

[56] References Cited
UNITED STATES PATENTS

| | | |
|---|---|---|
| 1,796,114 | 3/1931 | Meadowcroft........... 113/116 D UX |
| 1,808,561 | 6/1931 | Ledwinka.............. 113/116 D UX |
| 3,310,861 | 3/1967 | Oddsen.......................... 29/505 X |
| 3,540,116 | 11/1970 | Drahos et al. .................... 29/509 X |

FOREIGN PATENTS OR APPLICATIONS
1,153,872   5/1969   United Kingdom................... 29/505

*Primary Examiner*—Victor A. Dipalma
*Attorney, Agent, or Firm*—Robert E. Burns; Emmanuel J. Lobato; Bruce L. Adams

[57] ABSTRACT

To provide reinforcement to a lock joint between sheet metal members which are seamed together, at least one raised portion and a suitably configured protuberance are formed respectively in the sheet metal parts, wherein the raised portion and the protuberance are held in close engagement with each other so that the sheet metal members are, once combined together, prevented from being displaced from their respective relative positions.

3 Claims, 10 Drawing Figures

3,909,918

METHOD OF JOINING THE EDGE PORTIONS OF TWO SHEETS

BACKGROUND OF THE INVENTION

The present invention relates to a method of joining the edge portions of two sheets without using supplementary means such as mechanical fasteners, metal-to-metal adhesives or welding techniques.

Sheet metal members are often joined by a lock joint which is produced by folding an edge portion of one member back over an edge portion of the other member. Examples of combinations of such sheet metal members are, in an automotive vehicle, inner and outer wall members of a door structure, a front fender and a front fender supporting hood, and an outer wall member and an associated reinforcing member of a trunk structure.

To assemble these sheet metal members by folding as mentioned above, it is a common practice to have one of the sheet metal members superimposed on the other and fold an edge portion of the former back over an edge portion of the latter so that the edge portions of the two members are in close contact. In order that two sheet metal members combined in this manner are prevented from being displaced relative to each other from their initially fixed positions, it is important that the sheet metal member held by the folded sheet metal member be sufficiently tightly held by the folded member so that no gap exists between the edge of the edge portion of the former and folded over end of the latter. Since, however, the dimensional accuracy usually varies from one sheet metal member to another where the sheet metal members are manufactured on a large scale commercial basis, and for the purpose of achieving satisfactory productivity in the assembly of the sheet metal members as in the automotive industry, it is practically impossible to achieve a gap-free fit between sheet metal members which are combined together by the prior art folding process. To prevent relative displacement between joined sheet metal members, the sheet metal members may be subjected to additional processing such as, for example, spot-welding or bonding with a metal-to-metal adhesive during the assembly operation to provide reinforcement for the lock joint produced in the assembled structure. If, however, the sheet metal members are spot-welded when they are being joined together, the members tend to be distorted and additional operations and equipment are necessitated to remedy the distortion of the members combined; especially with members which are oriented outwardly in working positions in a final product such as an automotive vehicle. To constantly achieve accuracy in the spot-welding operations of a great number of workpieces, sustained maintenance and servicing efforts are indispensable of jigs used for the spot-welding operations. If, on the other hand, a metal-to-metal adhesive is used to reinforce the lock joint between the sheet metal members, it becomes difficult to maintain the initially fixed relative positions of the joined members throughout the succeeding steps of the assembly operation during which the adhesive applied to the members remains wet. Sheet metal members joined together using a metal-to-metal adhesive are thus still subject to relative displacement until they are painted and baked during the final stages of the assembly operation. The present invention contemplates elimination of all the above mentioned drawbacks which are inherent in joining edge portions of two sheet metal members by a prior art folding process.

SUMMARY OF THE INVENTION

It is accordingly an important object of the present invention to provide a method of tightly joining the edge portions of two sheets without supplementary processing such as chemical bonding, welding, or the use of supplementary fasteners such as bolts or rivets.

BRIEF DESCRIPTION OF THE DRAWINGS

The above and other objects, features and advantages of a method according to the present invention will become apparent from the following description taken in conjunction with the accompanying drawing in which like reference numerals and characters designate corresponding parts and in which.

DESCRIPTION OF THE PREFERRED EMBODIMENTS

Figure 4B:
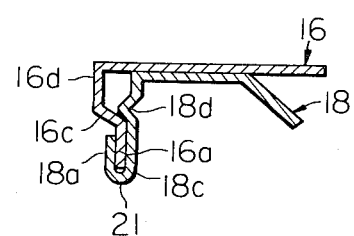
FIG. 4B is a cross sectional view of the sheets of FIG. 4A joined by the method thereof.
Figure 5A:
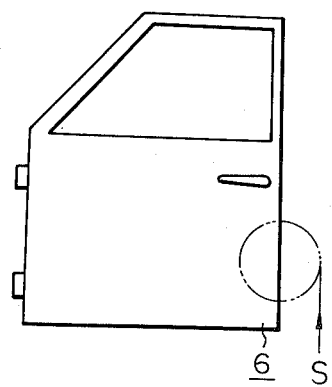
FIGS. 5A and 5B are plan views of a door assembly joined by a method of the invention.
Figure 5B:
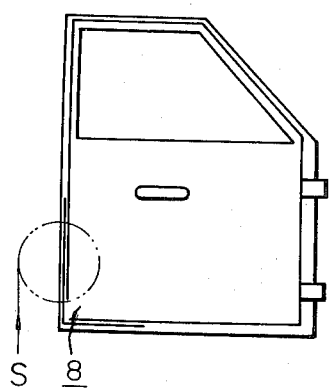

FIGS. 5A and 5B show an example of practical structural members joined by a method of the invention. An automotive door assembly includes a door 6 and a door inner panel 8 joined to the door 6. FIG. 5A shows the outside of the door 6 and FIG. 4B shows the inside of the door 6 and the inner panel 8. The methods of the invention relate to joining the door inner panel 8 to the door 6 by folding an edge portion of the door 6 back over the peripheral edge of the inner panel 8.

Figure 1:
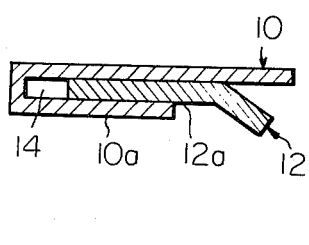
FIG. 1 is a cross sectional view showing an example two sheet metal members whose edges are joined together by a prior art folding process.

FIGS. 5A and 5B are exemplary only, and the invention is not limited to automotive doors or other automotive structures. FIGS. 1 to 3 can be considered as illustrating methods of joining the inner panel 8 to the door 6 within a portion surrounded by a broken circle S.

Referring to FIG. 1, edge portions of sheet metal members 10 and 12 are joined by a conventional folding method so that an edge portion 10a of the sheet metal member 10 is folded back over an edge portion 12a of the other sheet metal member 12 so that the latter is tightly gripped by the former. For the reasons above, a gap 14 tends to be produced between the inner surface of the folded end of the sheet metal member 10 and the edge of the edge portion 12a of the sheet metal member 12. The goal of the present invention is to join the edges of the sheet metal members 10 and 12 by a sufficiently tight lock joint which can be produced without the use of mechanical fasteners, metal-to-metal adhesives or spot-welding.

The methods of joining the edges of two sheets according to the invention will now be described in reference to FIGS. 2 to 4. In order to eliminate any ambiguity involving terminology, brief definitions of terms used in describing the figures and in the appended claims will now be presented.

An edge or bent edge refers to a portion of a sheet including the actual edge thereof and extending by a small distance into the sheet. An edge portion refers to a portion of a sheet extending by a larger distance into the sheet. If the edge (as defined above) of the sheet is not bent, an edge portion includes the edge. If the edge of the sheet has been bent, the edge portion extends from the bend into the sheet by the larger distance. A reference surface of a sheet is a surface used to define a bending angle with reference thereto. In the drawings, the surfaces of the sheets are shown as being flat for simplicity of explanation, and the reference surfaces are the actual surfaces of the sheets as shown prior to bending. These terms will become clear when they are used with reference to the drawings.

Figure 2A:
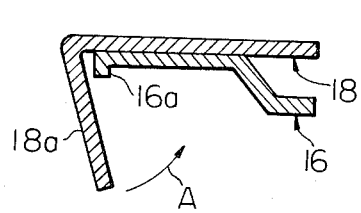
FIG. 2A is a cross sectional view of edges of two sheets positioned to be joined by a first method of the invention.
Figures 2B, 3A:
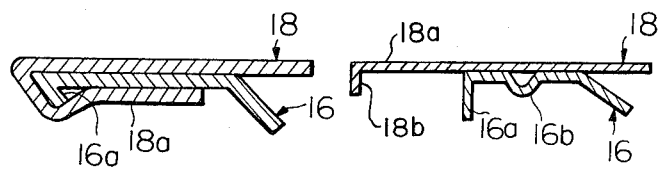
FIG. 2B is a cross sectional view of the sheets of FIG. 2A joined by the method thereof.
FIG. 3A is a cross sectional view of edges of two sheets positioned to be joined by a second method of the invention.

FIGS. 2A and 2B show the most basic method of the invention for joining the edges of one sheet 16 and another sheet 18. The first step is to bend an edge 16*a* of the one sheet 16 at a first predetermined angle to the reference surface of the one sheet 16. The sheets are then placed together so that an edge portion 18*a* of the other sheet 18 extends beyond the bent edge of the one sheet 16. The edge portion 18*a* is then folded back over the one sheet 16 so that the bent edge 16*a* of the one sheet 16 is enclosed by the folded over edge portion 18*a* of the other sheet 18. It will be clear that the sheets are firmly joined together since the bent edge 16*a* is tightly gripped between the edge portion 18*a* and the adjacent portion of the other sheet 18 (no numeral), and that mating surfaces of the sheets are in close contact. An arrow A indicates the direction of folding the edge portion 18*a* over the sheet 16.

Figure 3B:
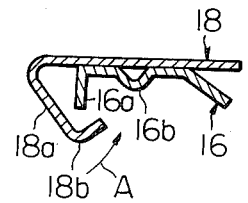
FIG. 3B is a cross sectional view of the sheets of FIG. 3A partially joined by the method thereof.
Figure 3C:
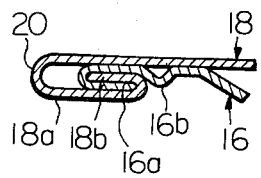
FIG. 3C is a cross sectional view of the sheets of FIG. 3A fully joined by the method thereof.

FIGS. 3A, 3B and 3C show another method of the invention, in which the bent edge 16*a* of the one sheet 16 is slightly longer than in the previous method. An edge 18*b* of the other sheet 18 is bent at a second predetermined angle to the reference surface of the other sheet 18 and the sheets are placed together as shown in FIG. 3A. A raised portion 16*b* is also formed on the one sheet 16 extending normal to the one sheet 16 in the same direction as the bent end 16*a*. The raised portion 16*b* is spaced from the end 16*a* of the one sheet 16 so that when the edge portion 18*a* of the other sheet 18 is folded back over the one sheet 16, the bent edge 16*a* of the one sheet 16 will be folded over the bent edge 18*b* of the other sheet 18, and vice versa as shown with the folded bent edges 16*a* and 18*b* spaced between the raised portion 16*b* and a folded back end 20 of the other sheet 18, and the raised portion 16*b* engages with the folded bent edge 18*b* of the other sheet 18 to tightly prevent relative movement of the sheets.

Figure 4A:
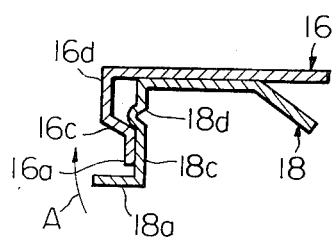
FIG. 4A is a cross sectional view of edges of two sheets positioned to be joined by a third method of the invention.

FIGS. 4A and 4B show another method of the invention, in which the relative positions of the sheets 16 and 18 are reversed as shown in the drawings. In this method, after the edge 16*a* of the one sheet 16 is bent as in the previous methods, an edge portion 16*c* of the one sheet 16 is bent in a direction opposite to that in which the edge 16*a* was bent so that the bent edge 16*a* is substantially parallel to the reference surface of the one sheet 16. It will be understood that it is not critical that the edge 16*a* be parallel to the reference surface, and significant deviation from parallelism is within the scope of the invention. Next, a portion 16*d* is bent in the same direction in which the edge portion 16*c* was bent to provide a third predetermined angle between the bent edges 16*a* and the reference surface of the one sheet 16. A portion 18*c* of the other sheet 18 is then bent so that it forms the third predetermined angle with the reference surface of the other sheet 18. It is assumed that the edge portion 18*a* of the other sheet 18 has not yet been bent to the position shown in FIG. 4A, and is an extension of the portion 18*c*. As shown, the bent edge 16*a* contacts the portion 18*c*. If desired, the edge portion 18*a* of the other sheet 18 may be bent to a right angle as shown in FIG. 4A prior to final folding over the bent edge 16*a*, or the folding may be done in one continuous operation. A raised portion 18*d* is formed on the other sheet 18 so that when the edge portion 18*a* is folded back over the bent edge 16*a*, the bent edge 16*a* of the one sheet 16 will be spaced between the raised portion 18*d* of the other sheet 18 and a folded back end 21 of the other sheet 18 and the raised portion 18*d* will engage with the edge portion 16*c* of the one sheet to prevent relative movement of the sheets.

Although chemical adhesives etc. are not necessary to obtain a strong lock joint according to the invention, the may be resorted to if desired to increase the strength of the joint. Also, various steps as described may be interchanged or combined, or new steps added as desired within the scope of the invention, as long as the final result is the same as described and claimed. For example, in the method of FIGS. 3A, 3B and 3C, the edge portion 18*a* of the other sheet 18 may be bent to the right angle shown in FIG. 3A as a separate step prior to the final folding step illustrated in FIGS. 3B and 3C.

What is claimed is:

1. A method of joining two sheets at their edges, comprising the steps of:
   a. bending an edge of one sheet to form a first predetermined angle with a reference surface of the one sheet;
   b. placing the sheets together so that an edge portion of the other sheet extends beyond the bent edge of the one sheet;
   c. folding the edge portion of the other sheet back over the first sheet so that mating surfaces of the two sheets are in tight contact and the bent edge of the one sheet is enclosed by the folded over edge portion of the other sheet;
   d. bending an edge of the other sheet to form a second predetermined angle with a reference surface of the other sheet;
      prior to performing step *b*;
      and in which the sheets are relatively oriented during step *b* so that when step *c* is performed, the bent edge of the one sheet will be folded over the bent edge of the other sheet, and the bent edge of the other sheet will be folded over the bent edge of the one sheet; and
   e. forming a raised portion on the one sheet near the bent edge thereof extending normally from the one sheet in the same direction as the bent edge thereof;

the raised portion being spaced from the bent edge of the one sheet so that when step *c* is performed, the folded bent edges of the sheets will be spaced between the raised portion and the folded back end of the other sheet, and the raised portion will engage with the folded bent edge of the other sheet to prevent relative movement thereof.

2. A method of joining first and second sheets at their edges, comprising the steps of:
a. bending an end portion of a first sheet to form an angle with respect to a mating surface of the first sheet and bending an end portion of a second sheet to form an angle with respect to a mating surface of the second sheet;
b. forming a raised portion on the first sheet near the bent edge thereof extending normally from the first sheet in the same direction as the bent edge thereof;
c. overlaying the first sheet and second sheet mating surfaces on each other so that the bent end portions of the first and second sheets are coextensive with and spaced from each other;
d. bending a portion of the second sheet adjacent the bent end portion of the first sheet back over so that the bent end of the second sheet engages with the bent end of the first sheet; and
e. pressing the engaged both ends of the first and second sheets so that said engaged both ends fold together and form a folded portion which abuts the raised portion in a manner that the folded portion is located between the raised portion and the outer edge of the folded portion to prevent the relative movement of the first and second sheets.

3. A method as claimed in claim 2, in the step *a* of which, the two angles respectively formed on said first and second sheets are generally rectangular.

* * * * *